(12) United States Patent
Ai (10) Patent No.: US 7,961,569 B2
(45) Date of Patent: Jun. 14, 2011

(54) INFORMATION RECORDING DEVICE CAPABLE OF HIGH SPEED PHYSICAL REFORMATTING AND RECORDING

(75) Inventor: Takaharu Ai, Sakai (JP)

(73) Assignee: Panasonic Corporation, Osaka (JP)

( * ) Notice: Subject to any disclaimer, the term of this patent is extended or adjusted under 35 U.S.C. 154(b) by 1070 days.

(21) Appl. No.: 10/559,908

(22) PCT Filed: May 10, 2005

(86) PCT No.: PCT/JP2005/008533
§ 371 (c)(1),
(2), (4) Date: Dec. 8, 2005

(87) PCT Pub. No.: WO2005/109432
PCT Pub. Date: Nov. 17, 2005

(65) Prior Publication Data
US 2007/0094550 A1    Apr. 26, 2007

(30) Foreign Application Priority Data
May 11, 2004   (JP) ................ 2004-141424

(51) Int. Cl.
*G11B 20/10* (2006.01)
(52) U.S. Cl. ........................... 369/47.14
(58) Field of Classification Search .......... None
See application file for complete search history.

(56) References Cited

U.S. PATENT DOCUMENTS

| | | | |
|---|---|---|---|
| 5,303,219 A | 4/1994 | Kulakowski et al. | |
| 5,872,905 A | 2/1999 | Ono et al. | |
| 6,049,515 A | 4/2000 | Yamamuro | |
| 6,160,778 A | 12/2000 | Ito et al. | |
| 6,189,118 B1 * | 2/2001 | Sasaki et al. | 714/710 |
| 6,327,679 B1 * | 12/2001 | Russell | 714/710 |
| 6,526,522 B1 | 2/2003 | Park et al. | |
| 6,963,523 B1 | 11/2005 | Park | |
| 7,327,646 B2 | 2/2008 | Park | |
| 7,581,017 B2 * | 8/2009 | Hattori | 709/232 |
| 7,738,353 B2 * | 6/2010 | Kwon et al. | 369/275.3 |
| 2002/0007472 A1 * | 1/2002 | Ko et al. | 714/42 |
| 2002/0049937 A1 | 4/2002 | Ko | |
| 2003/0210627 A1 | 11/2003 | Ijtsma et al. | |

(Continued)

FOREIGN PATENT DOCUMENTS
EP          1 132 914        9/2001
(Continued)

*Primary Examiner* — Joseph H Feild
*Assistant Examiner* — Parul Gupta
(74) *Attorney, Agent, or Firm* — Hamre, Schumann, Mueller & Larson, P.C.

(57) ABSTRACT

An information recording device is provided, which is capable of performing physical reformatting at a high speed while avoiding unnecessary substitution processing after the physical reformatting. A disc recording and reproduction drive 1020 records information on an information recording medium including a volume space for recording user data, a spare area containing a substitute area that can be used instead of a defective area, and a defect management information area for recording defect management information. The defect management information includes defect location information indicating the location of defective areas and defect status information indicating the attributes of the defective area. The information recording device includes an initialization processing module 1072 which, during the physical reformatting of the information recording medium, while maintaining at least the defect location information portion of the defect management information, overwrites said defect status information with attributes indicating that said defective area has been physically reformatted.

6 Claims, 10 Drawing Sheets

U.S. PATENT DOCUMENTS

2005/0265191 A1 * 12/2005 Hwang et al. .............. 369/53.15
2008/0062830 A1    3/2008 Park

FOREIGN PATENT DOCUMENTS

| | | |
|---|---|---|
| JP | 10-124262 A | 5/1998 |
| JP | 2000-021092 | 1/2000 |
| JP | 2000-215612 A | 8/2000 |
| JP | 2000-322835 | 11/2000 |
| JP | 2001-312865 | 11/2001 |
| JP | 2003-317206 | 11/2003 |

* cited by examiner

| Flag | Definition |
|---|---|
| 0000 | A substitute cluster is allocated to a defective cluster, the data of the defective cluster is recorded in the substitute cluster |
| 1000 | A substitute cluster is allocated to a defective cluster, but the data of the defective cluster is not recorded in the substitute cluster |
| 0001 | No substitute clusters are allocated to defective clusters |
| 0010 | Invalidated DFL entry (the second address field shows locations that can be used as substitutes) |
| : | : |
| Other | (Undefined) |

FIG. 5B

| Flag | Definition |
|---|---|
| 0000 | Second status field unused |
| 1000 | Defective clusters have been physically reformatted |
| Other | (Undefined) |

INFORMATION RECORDING DEVICE CAPABLE OF HIGH SPEED PHYSICAL REFORMATTING AND RECORDING

TECHNICAL FIELD

The present invention relates to an information recording device for recording and reproducing information on optical discs and other information recording media.

BACKGROUND ART

In recent years, DVDs have gained widespread acceptance as optical discs permitting the recording of moving picture images in the form of digital information. In addition, Blu-ray discs (hereinafter called "BD" for short), which are known as the next-generation optical discs capable of recording at even higher densities than DVDs, already have reached the deployment stage.

In case of DVDs, BDs and other optical discs, the minimum unit of logical access is called a sector. In the past, when a DVD-RAM or a BD had sectors where information could not be recorded or reproduced (called "defective sectors"), the reliability of recording data was ensured by performing the so-called defect management, whereby ECC blocks (in case of a DVD) or clusters (in case of a BD) in good condition were substituted for ECC blocks or clusters containing defective sectors. Defective sectors are generated not only during disc manufacture, but also as a result of scratches, contamination, and the like, adhering to the surface of discs when discs are in use.

An example of a conventional optical disc where such defect management is performed, as well as an apparatus for its recording and reproduction, are disclosed in Patent Document 1. Here, explanations will be provided regarding the conventional optical disc (DVD) disclosed in Patent Document 1.

Figure 11:
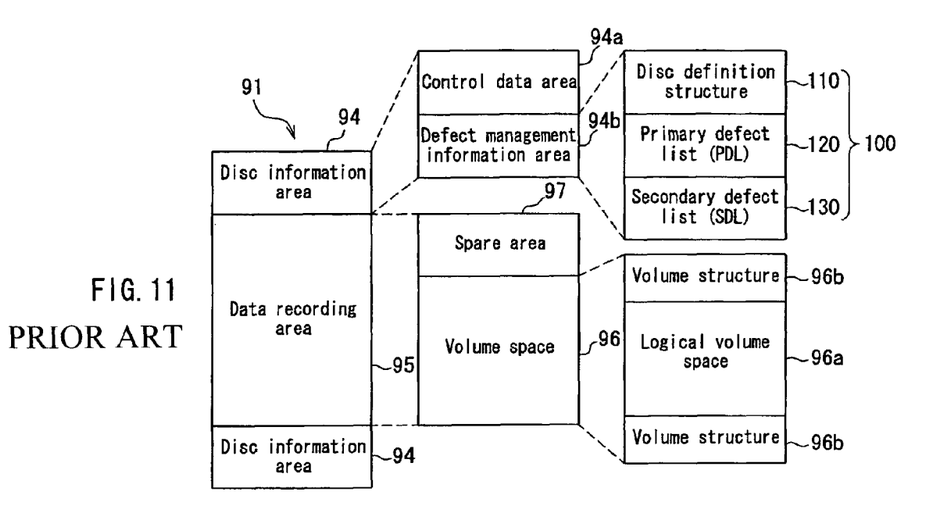
FIG. 11 is an explanatory figure showing an example of the logical structure of a recording area in a conventional information recording medium.

As shown in FIG. 11, a conventional optical disc 91 has a data recording area 95 and disc information areas 94. Parameters necessary for accessing the disc 91 are stored in the disc information areas 94. In this example, the disc information areas 94 are provided both on the innermost peripheral side and on the outermost peripheral side of the disc 91. The disc information area 94 on the innermost peripheral side is called the lead-in (lead-in) area. The disc information area 94 on the outermost peripheral side is called the lead-out (lead-out) area.

The recording and reproduction of data is performed in the data recording area 95. An absolute address called a physical sector number (hereinafter called PSN for short) is allocated in advance to each of the sectors of the data recording area 95.

A higher level control device (typically a host computer) issues an instruction for recording or reproduction to an optical disc device in sector units. When an instruction is issued by the higher-level control device to perform reproduction of a certain sector, the optical disc device reproduces the ECC block containing the sector from the disc and performs error correction, after which it sends back only the portion of the data that corresponds to the designated sector. In addition, when an instruction is issued by the higher-level control device to perform recording in a certain sector, the optical disc device reproduces the ECC block containing the sector from the disc and performs error correction, after which it substitutes recording data obtained from the higher-level control device for the portion of the data corresponding to the designated sector, re-calculates and re-assigns an error correction code to the ECC block, and records the ECC block containing the sector on the disc. This type of recording operation is called "read-modified write"

The data recording area 95 contains a volume space 96 and a spare area 97. The volume space 96, which is an area intended for storage of user data, contains a logical volume space 96a and volume structures 96b showing the structure of the logical volume space 96a. To provide access to the volume space 96, logical sector numbers (hereinafter called LSNs for short) are allocated to the sectors contained in the volume space 96. Data recording and reproduction is performed by accessing sectors on the disc 91 using the LSNs.

The spare area 97 contains at least one sector (substitute sector) that can be used in place of a defective sector when a defective sector is generated in the volume space 96.

The disc information areas 94 each contain a control data area 94a and a defect management information area 94b. Defect management information 100, which is used for managing defective sectors, is stored within the defect management information area 94b.

The defect management information 100 includes a disc definition structure 110, a primary defect list (hereinafter called PDL for short) 120, and a secondary defect list (hereinafter called SDL for short) 130.

The PDL 120 is used to manage defective sectors detected during inspection prior to shipment of the disc 91. The pre-shipment inspection of the disc 91 usually is performed by the manufacturer of the disc 91. The SDL 130 is used to manage defective sectors detected when a user uses the disc 91.

Figure 12:
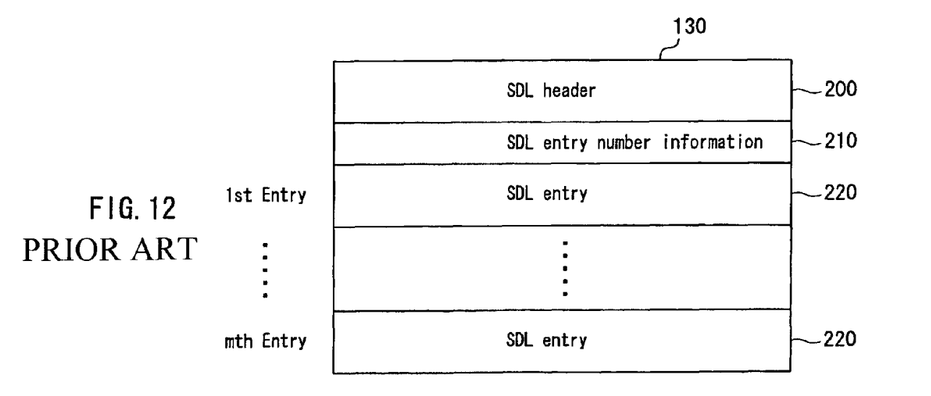
FIG. 12 is a diagram showing an example of a defect list in a conventional information recording medium.

FIG. 12 shows the structure of the SDL 130. The SDL 130 contains a secondary defect list header (SDL header) 200 containing an identifier identifying it as an SDL, information (SDL entry number information) 210 showing the number of SDL entries 220 registered in the SDL, and one or more SDL entries 220 (in the example shown in FIG. 12, entry 1 through entry m). Note that a value of zero in the SDL entry number information 210 shows that there are no defective sectors registered in the SDL.

Figure 13:
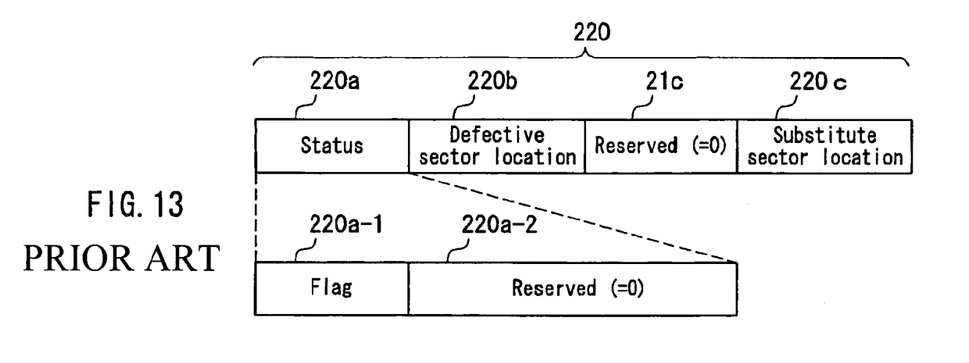
FIG. 13 is a diagram showing the structure of SDL entries in the conventional defect list of FIG. 12.

FIG. 13 shows the structure of an SDL entry 220. An SDL entry 220 contains a status field 220a, a field 220b for storing information describing the location of defective sectors, and a field 220c used for storing information describing the location of substitute sectors substituted for defective sectors.

The status field 220a is used to indicate whether substitute sectors have been substituted for defective sectors. The location of the defective sectors is represented, for instance, by the physical sector numbers of the defective sectors. The location of the substitute sectors is represented, for instance, by the physical sector numbers of the substitute sectors.

The status field 220a contains, for instance, a 1-bit flag 220a-1 and a reserved area 220a-2. For example, a value of one in the flag 220a-1 indicates that no substitute sectors have been substituted for defective sectors. A value of zero in the flag 220a-1 indicates that a substitute sector has been substituted for a defective sector.

Although the above-explanations assume that defect management is performed in sector-units, defect management also is known to be performed in block-units, with each block constituted by a plurality of sectors. In such a case, information indicating the location of blocks (called "defective blocks") containing defective sectors (e.g., the physical sector numbers of the head sectors of the defective blocks) is registered in the SDL instead of information indicating the location of the defective sectors, and information that indicates the location of substitute blocks (for instance, the physical sector numbers of the head sectors of the substitute blocks) is registered instead of information indicating the location of the substitute sectors. For instance, in the case of a DVD, the unit of defect management is an ECC block, i.e. the unit utilized for error correction.

Incidentally, when the number of defective sectors increases, the frequency of substitute sector accesses becomes higher, thereby severely decreasing the speed of recording and reproduction and creating a particularly serious hindrance to the recording and reproduction of moving pictures. In addition, since substitute sectors are secured in the data recording area 95, when numerous substitute areas are secured as a result of increased frequency of substitution, the recordable volume of user data is reduced as well. In such a case, physical reformatting (re-initialization) is recommended after cleaning the disc to remove dirt adhered to the surface of the disc. Subsequently created defects mostly are due to, for example, fingerprints on the disc surface, and most of the subsequently created defects are eliminated by cleaning.

Conventionally, when physical reformatting was performed, all the contents of the status field 220*a*, field 220*b* and field 220*c* in the SDL entry 220 were invalidated In addition, the conventional technology described in Patent Document 1 relates mostly to DVDs, and in case of BDs, all the contents of the defect list are erased when physical reformatting is carried out.

Patent Document 1: JP 2000-322835A (FIGS. 1A~1C).

However, in the past, the erasure of the entire contents of the defect list resulted in the following problems.

Namely, because all of the contents of the defect list were erased during physical reformatting, information indicating the location of defective sectors (or sectors where defects could be present) also was lost. Therefore, when there were defects that disc surface cleaning did not eliminate, recording of new data on the disc after formatting could result in user data being recorded despite the possible presence of defects, which required reproduction to be performed for read-modified write. However, reproduction was impossible because of the defects, and, as a result, recording was impossible as well.

In addition, in the past, devices have been known that, after performing physical reformatting, optionally perform defect inspection processing (certification) by checking all the sectors on the disc for the presence of defects and registering information on the discovered defective sectors in a defect list.

As an example of such conventional authentication processing, a technique is known in which authentication data is written over the entire volume space of the disc and the presence of defects on the disc is determined by confirming whether or not the written data can be reproduced correctly. However, the problem with this method is that, in the case of a DVD, for instance, authentication processing requires close to one hour from start to finish, which is extremely inconvenient for the user.

In addition, a type of simplified defect inspection processing called quick certification (Quick Certification) is possible with BDs. During such processing, all the entries in a defect list are inspected for defective clusters, leaving the entries intact when there are defects and invalidating the entries when there are no defects. Therefore, the more entries a defect list has, the longer the processing time becomes, requiring up to 15 minutes or so in the worst case scenario.

DISCLOSURE OF INVENTION

Taking into account the above-described problems, it is an object of the present invention to provide an information recording device capable of high-speed physical reformatting while avoiding unnecessary substitution processing after physical reformatting.

In order to attain the above-mentioned object, the information recording device of the present invention is an information recording device for recording information on an information recording medium including a volume space for recording user data, a spare area containing a substitute area that can be used in place of a defective area contained in the volume space, and a defect management information area for recording defect management information used for managing the defective area, wherein the defect management information includes defect location information indicating the location of the defective area and defect status information indicating the status of the defective area, and an initialization processing module is provided that, during physical reformatting of the information recording medium, maintains at least the defect location information portion of the defect management information and, on the other hand, overwrites the defect status information using attributes indicating that the defective area has been physically reformatted.

The information recording device of the present invention permits a reduction in unnecessary substitution processing after physical reformatting by maintaining at least the defect location information, without erasing it, during the physical reformatting of an information recording medium. Moreover, maintaining at least the defect location information allows for the physical reformatting to be carried out at a higher speed because conventional authentication processing is unnecessary.

BEST MODE OF CARRYING OUT THE INVENTION

In the inventive information recording device of the above-described configuration, the defect management information further may include substitute location information indicating the location of the substitute area, and the initialization processing module may erase the substitute location information portion of the defect management information during the physical reformatting of the information recording medium. Because defects may be eliminated by cleaning etc. prior to and after physical reformatting, the number of unnecessary used substitute areas can be reduced by erasing substitute location information during physical reformatting.

In the inventive information recording device of the above-described configuration, the defect management information further may include substitute location information indicating the location of the substitute area and the initialization processing module may be set up to maintain the substitute location information portion of the defect management information during the physical reformatting of the information recording medium. As a result, substitute registration can be carried out at a high speed, because when recording is about to be performed in an area indicated by the defect location information and said area is defective, processing involving searching for and re-allocating an unused area among the substitute areas is unnecessary.

It is preferable that the inventive information recording device of the above-described configuration further includes a control module for performing at least one of recording processing and reproduction processing in an area indicated by defect location information corresponding to defect status information having the attributes and forming part of the defect management information based on the assumption that there are no significant user data.

For instance, the control module may be set up to perform recording of new user data in an area indicated by the defect location information corresponding to defect status information having the attributes and forming part of the defect management information without reproducing data from said area. In this case, the fact that the read processing of the read modified write operation becomes unnecessary makes it possible to avoid the problem whereby data recording is rendered impossible by the impossibility of data reproduction from the disc.

Otherwise, the device may be set up such that, upon receipt of a reproduction instruction regarding areas indicated by defect location information corresponding to defect status information having the attributes and forming part of the defect management information, the control module, without reproducing data from said area, generates dummy data and uses it instead of reproducing data from said area. In this case, repetition of unnecessary reproduction attempts can be prevented by avoiding reproduction processing that is highly likely to result in errors due to defects.

It is preferable that the inventive information recording device of the above-described configuration further includes a control module for performing at least one of recording processing and reproduction processing in an area indicated by defect location information corresponding to defect status information having the attributes and forming part of the defect management information based on the assumption that defects in said area may have been eliminated. Performing recording and reproduction processing on the assumption that defects may have been eliminated can reduce the number of unnecessary substitute registration operations if defects have been eliminated by cleaning etc. prior to or after physical reformatting.

For instance, it is preferable that after performing trial recording of data in an area indicated by defect location information corresponding to defect status information having the attributes and forming part of the defect management information, the control module invalidates the defect management information related to said area in case of success and allocates a substitute area to said area in case of failure. This offers the advantage of being able to reduce the number of unnecessary substitute registration operations.

In addition, when user data is recorded in a defective area indicated by the defect location information forming part of the defect management information or when a substitute area is substituted for the defective area in the course of substitution processing, the inventive information recording device of the above-described configuration preferably erases attributes indicating that the defective area has been physically reformatted from the defect management information.

In addition, it is preferable that the inventive information recording device of the above-described configuration further includes an inspection processing module for inspecting an area indicated by defect location information corresponding to defect management information having attributes indicating that physical reformatting has been performed while there are no operation instructions from a higher-level control device and invalidating the defect management information if defects in said area have been eliminated and allocating a substitute area to said area if defects in said area are confirmed.

A specific embodiment of the present invention is explained below by referring to drawings.

In the present embodiment, Disk 1 is a disc-shaped rewritable information recording medium. Here, a BD is used as a specific example of the disc 1, but the disc 1 is not limited to BDs and may be a DVD-RAM, etc.

Figure 1:
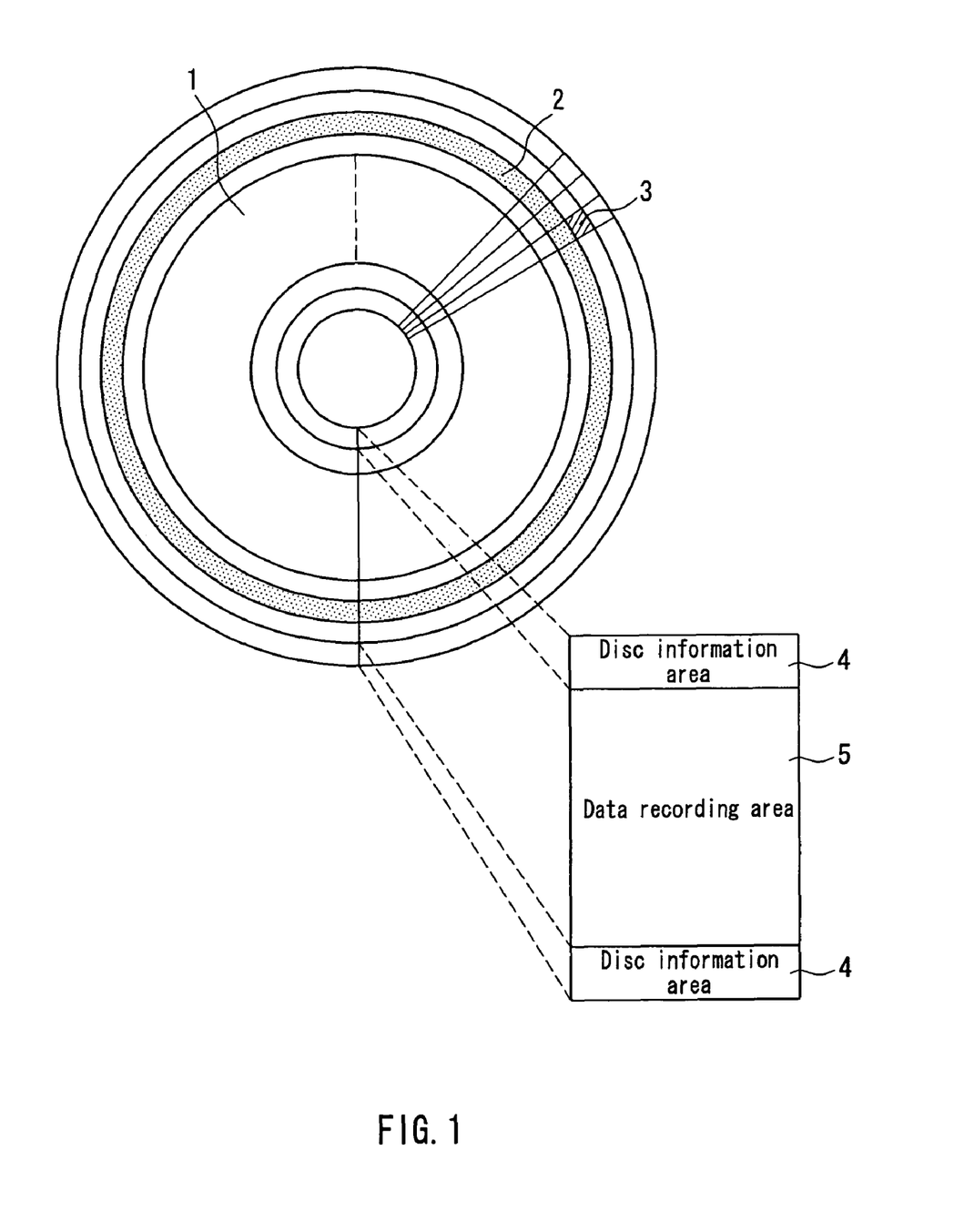
FIG. 1 is an explanatory figure showing the structure of a recording area of an information recording medium according to an embodiment of the present invention.

FIG. 1 shows the physical structure of the disc 1. A plurality of concentric or spiral tracks 2 are formed on the disc 1. Each one of the plurality of tracks 2 is divided into a plurality of sectors 3. The areas of the disc 1 include one or more disc information areas 4 and a data recording area 5. In the example of FIG. 1, two disc information areas 4 are provided respectively on the innermost peripheral side and outermost peripheral side of the disc 1. The disc information area 4 on the innermost peripheral side also is called the lead-in (lead-in) area. The disc information area 4 on the outermost peripheral side also is called the lead-out (lead-out) area.

The recording and reproduction of data is carried out in the data recording area 5. Absolute addresses called physical sector numbers (hereinafter called PSNs for short) are allocated to all the sectors of the data recording area 5 in advance.

Figure 2:
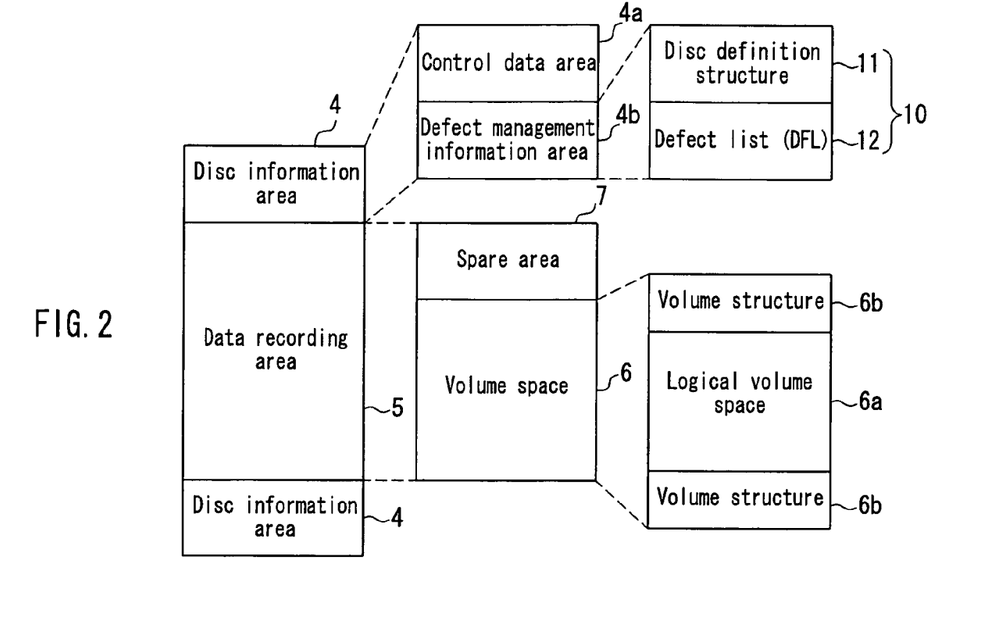
FIG. 2 is an explanatory figure showing the logical structure of a recording area in an information recording medium according to an embodiment of the present invention.

FIG. 2 shows the logical structure of the areas of the disc 1.

The data recording area 5 includes a volume space 6 and a spare area 7. The volume space 6 is an area intended for storing user data. To access the volume space 6, logical sector numbers (hereinafter called LSNs for short) are allocated to the sectors contained in the volume space 6. The recording and reproduction of data is carried out by accessing sectors on the disc 1 using their LSNs.

The spare area 7 contains at least one sector that can be used in place of a defective sector if defective sectors are present in the volume space 6. In addition, while the following explanations assume that substitution processing on the disc 1 (BD) of the present embodiment is carried out in cluster-units, a cluster being a unit of error correction, the present invention is not limited to the above.

The spare area 7 is located further toward the inner peripheral side of the disc 1 than the volume space 6. It is used to carry out high-speed substitution processing of clusters containing defective sectors (hereinafter called "defective clusters") when defective sectors are generated in areas storing file management information (unused space management information, root directory file entries, etc.). The file management information is stored in the vicinity of sectors to which logical sector numbers of "0" are allocated. Therefore, arranging the spare area 7 further toward the inner peripheral side of the disc 1 than the volume space 6 permits a reduction in the seek distance between defective clusters and substitute clusters. As a result, the speed of substitution processing of the defective clusters is increased. The frequency of access to file management information is high, which is why file management information is required to have high data reliability. Therefore, high-speed substitution processing of defective clusters generated in areas storing file management information is extremely useful.

The volume space 6 includes a logical volume space 6a and volume structures 6b, which show the structure of the logical volume space 6a. Unused space management information indicating whether the sectors in the logical volume space 6a are used or unused, one or more data extents where file contents are stored, and file entries, where one or more data extents corresponding to the files are registered, are stored in the logical volume space 6a. This information is used to manage files.

The disc information areas 4 each contain a control data area 4a and a defect management information area 4b. Defect management information 10 used for managing clusters containing defective sectors is stored in the defect management information area 4b.

The defect management information 10 contains a disc definition structure 11 and a defect list (hereinafter called DFL for short) 12.

The DFL 12 is used to manage defective sectors detected during pre-shipment inspection of the disc 1 and defective sectors detected during use of the disc 1 by a user. In addition, the pre-shipment inspection of the disc 1 is usually performed by the manufacturer of the disc 1.

Figure 3:
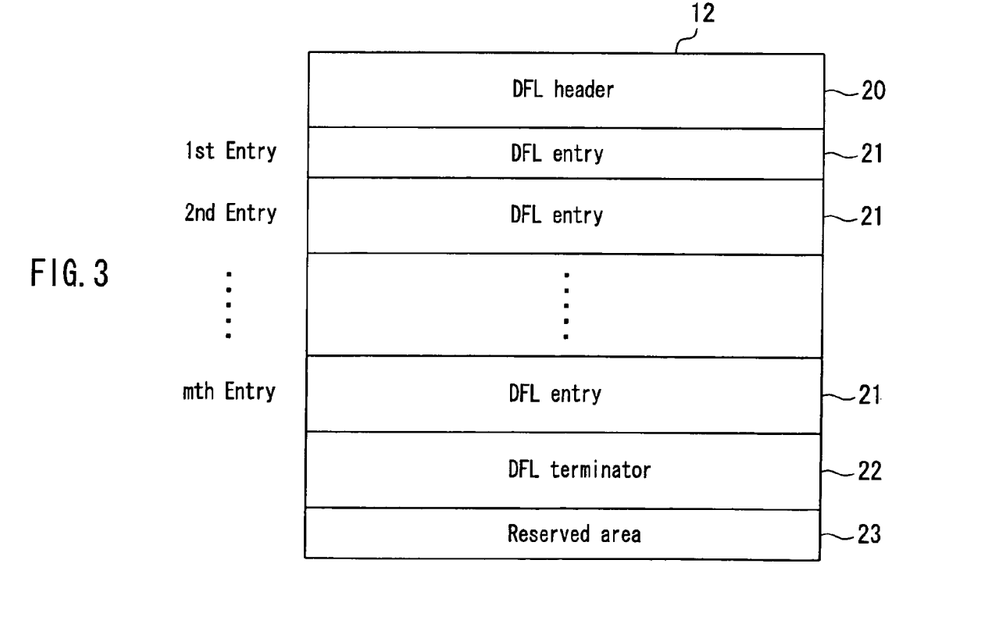
FIG. 3 is a diagram showing the structure of the DFL 12 shown in FIG. 2.

FIG. 3 shows the structure of the DFL 12.

The DFL 12 contains a defect list header. (DFL header) 20, which indicates that this is a DFL, one or more DFL entries 21 (in the example shown in FIG. 3, entry 1 through entry m), a DFL terminator 22, which represents the end of the DFL entries, and a reserved area 23.

Figure 4:
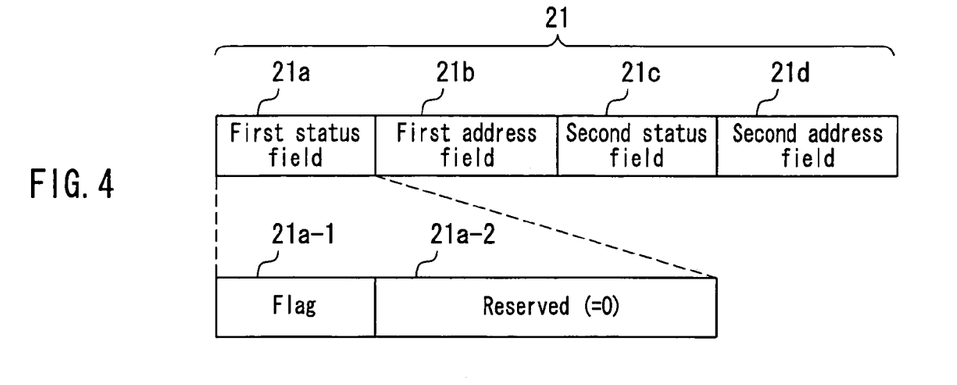
FIG. 4 is a diagram showing the structure of a DFL entry 21 in the DFL 12.

FIG. 4 shows the structure of a DFL entry 21.

A DFL entry 21 includes a first status field 21a, a first address field 21b, a second status field 21c, and a second address field 21d. In addition, the structure of the DFL entries is not limited to the one described above and may include other optional fields.

The first status field 21a and second status field 21c show the attributes of said DFL entry 21, as will be described below. Information regarding the location of defective clusters or substitute clusters, depending on the attributes of the first status field 21a and second status field 21c, is stored in the first address field 21b and second address field 21d. For instance, in some cases, the physical sector numbers of the head sectors of defective clusters are stored in the first address field 21b and the physical sector numbers of the head sectors of substitute clusters are stored in the second address field 21d.

In the present embodiment, in addition to the DFL entries related to clusters containing defective sectors where recording and reproduction is actually impossible, the DFL 12 also may contain DFL entries related to clusters that contained defective sectors in the past but in which defects have been eliminated by cleaning etc. during physical reformatting. In other words, while all of the information related to defective clusters used to be erased when physical reformatting was performed in the past, in the present embodiment, at least information on the location of defective clusters in all the DFL entries 21 of the DFL 12 is not erased and is left intact during physical reformatting. In addition, a unique code (explained below in detail) representing the fact that said defective clusters have been physically reformatted is provided in the second status field 21c of said DFL entry 21. In addition, information on the location of defective clusters is stored in either one of the first address field 21b and second address field 21d, or in both fields.

Figure 5A:
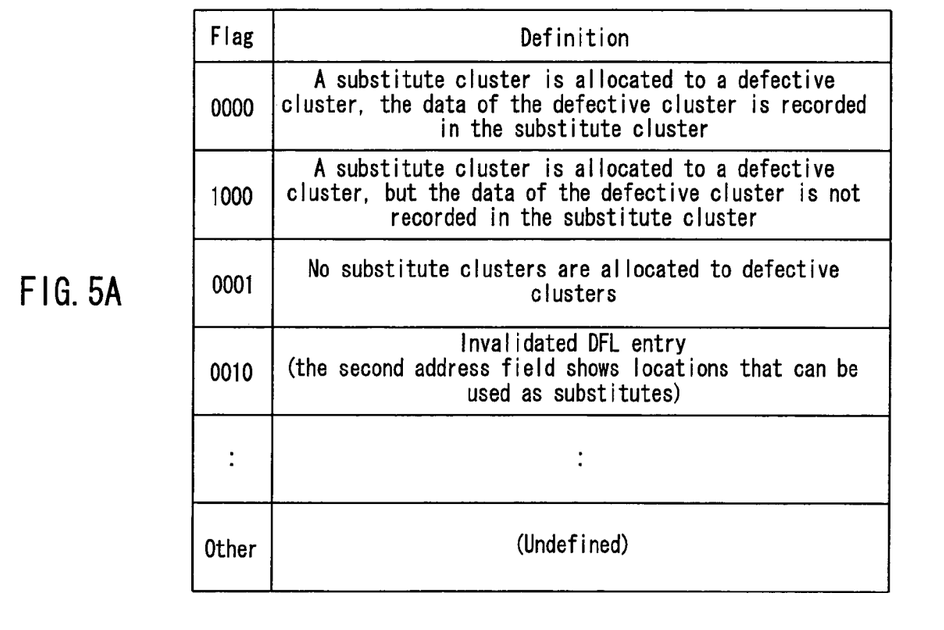
FIG. 5A is a diagram showing an example of the definition of a first status field 21*a* in a DFL entry 21.

The first status field 21a may contain a 4-bit flag 21a-1 and a reserved area 21a-2. FIG. 5A shows an example of the definition of the flag 21a-1. For example, a value of 0000 in the flag 21a-1 indicates that substitute clusters have been allocated to defective clusters and the user data of the defective clusters has been recorded in the substitute clusters. In addition, a value of 1000 in the flag 21a-1 indicates that while substitute clusters have been allocated to the defective clusters, the user data of the defective clusters has not been recorded in the substitute clusters. In addition, a value of 0001 in the flag 21a-1 indicates that substitute clusters have not been allocated to defective clusters. Furthermore, a value of 0010 in the flag 21a-1 indicates that said DFL entry has been invalidated. The expression "has been invalidated" means that said DFL entry does not contain significant information on the location of defective clusters. However, the sector addresses designated in the second address field 21d of said DFL entry mean that clusters starting with said sectors can be utilized as future substitutes.

Figure 5B:
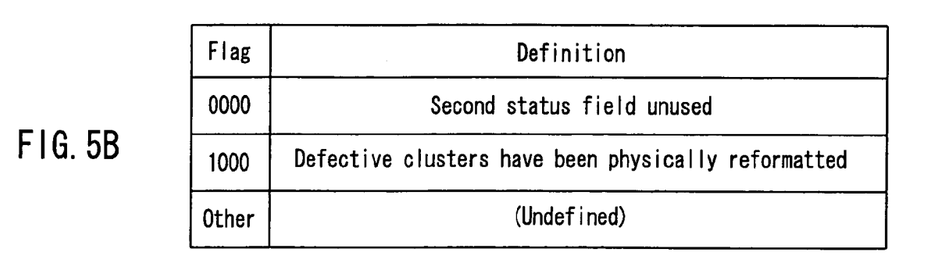
FIG. 5B is a diagram showing an example of the definition of a second status field 21*c* in a DFL entry 21.

As shown in FIG. 5B, a value of 0000 in the second status field 21c indicates that said field is not used, and when a value of 1000 means that clusters indicated in the first address field 21b or second address field 21d have been physically reformatted. This has two meanings, i.e. that the defects of clusters indicated in the first address field 21b or second address field 21d may have been eliminated by cleaning etc. during physical reformatting, and that there is no significant user data in the defective clusters and substitute clusters.

While the above-described codes of the first status field 21a, i.e. 0000, 0001, 1000, etc., are set depending on the substitution status during the recording and reproduction of the disc 1, the code 1000 of the second status field 21c, as will be described below, is set in this field by the disc recording/reproduction drive during the physical reformatting of the disc 1.

In addition, the definitions of the first status field 21a and second status field 21c shown in FIGS. 5A and 5B are mere examples, and the number of bits in the flags representing substitution status in the inventive information recording medium, as well as their definitions, are not limited to this example.

An embodiment of an information recording and reproduction device corresponding to the above-described disc 1 is explained below by referring to drawings.

Figure 6:
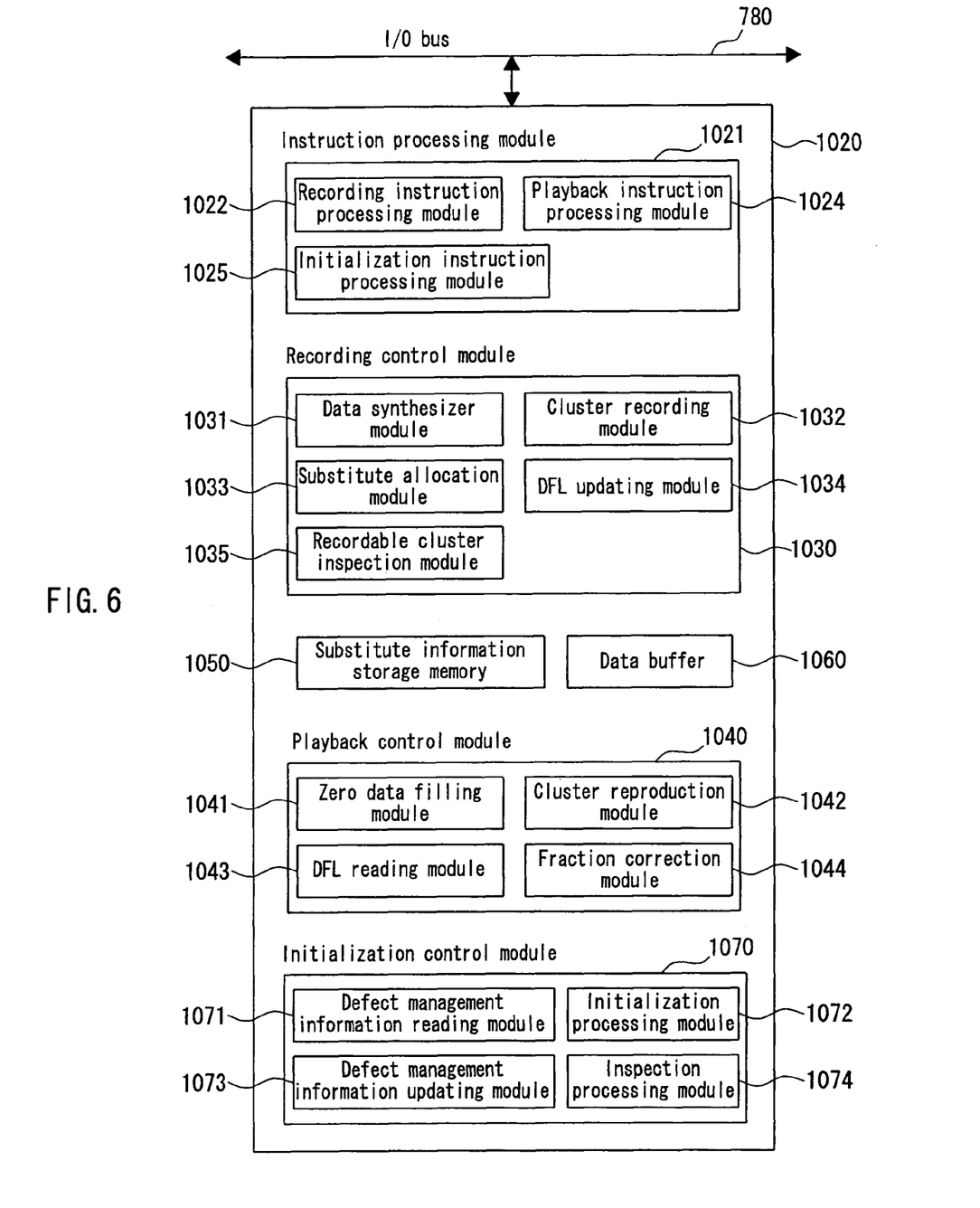
FIG. 6 is a block diagram showing the configuration of a disc recording and reproduction drive 1020 according to an embodiment of the present invention.

FIG. 6 is a block diagram showing the configuration of a disc recording and reproduction drive 1020 used in the present embodiment. The disc recording and reproduction drive 1020 is connected to a higher-level control device (not shown) via an I/O bus 780. The higher-level control device, which is commonly called the host, is a device that manages recording data on the disc 1 using a file system. In addition, while the higher-level control device and disc recording and reproduction drive 1020 can be implemented as mutually independent hardware, they of course can be implemented as a single apparatus.

The disc recording and reproduction drive 1020 contains a microprocessor incorporating a memory used for calculation and a control program. The disc recording and reproduction drive 1020, which is constituted by signal processing circuitry and a mechanism controlled by the microprocessor, includes an instruction processing module 1021 for processing instructions received from the higher-level control device, a recording control module 1030 for carrying out control during recording on the disc 1, a reproduction control module 1040 for carrying out control during reproduction from the disc 1, a substitute information storage memory 1050 for storing information on defective clusters and their substitute clusters, a data buffer 1060 for temporarily storing recording and reproduction data, and an initialization control module 1070 for carrying out control during the initialization of the disc 1. The instruction processing module 1021, recording control module 1030, reproduction control module 1040, and initialization control module 1070 are functional blocks implemented by the microprocessor running a predetermined software program.

The instruction processing module 1021 includes a recording instruction processing module 1022 for processing recording instructions received from the higher-level control device, a reproduction instruction processing module 1024 for processing reproduction instructions received from the higher-level control device, and an initialization instruction processing module 1025 for processing initialization instructions received from the higher-level control device.

The recording control module 1030 includes a data synthesizer module 1031 for converting recording data from sector units to cluster units, a cluster recording module 1032 for recording data on the disc 1 in cluster units, a substitute allocation module 1033 for allocating substitute clusters to defective clusters, a DFL updating module 1034 for recording the contents of the substitute information storage memory 1050 in the DFL on the disc 1, and a recordable cluster inspection module 1035 for determining the clusters in which recording is to be performed, etc.

The reproduction control module 1040 includes a zero-data filling module 1041 for overwriting a portion of the data buffer 1060 with zeros, a cluster reproduction module 1042 for reproducing data from the disc 1 in cluster units, a DFL reading module 1043 for storing the contents reproduced from the DFL on the disc 1 in the substitute information storage memory 1050, and a fraction correction module 1044.

The initialization control module 1070 includes a defect management information reading module 1071 for reading defect management information 10 from the disc 1, an initialization processing module 1072 for performing the initialization processing of the defect management information 10 read from the disc 1, a defect management information updating module 1073 for writing the initialized defect management information 10 to the disc 1, and an inspection processing module 1074 for performing defect inspection (described below) of physically reformatted clusters while there are no operation instructions, such as recording instructions or reproduction instructions, from the higher-level control device.

The operation of the disc recording and reproduction drive 1020 shown in FIG. 6 is described below.

Figure 7:
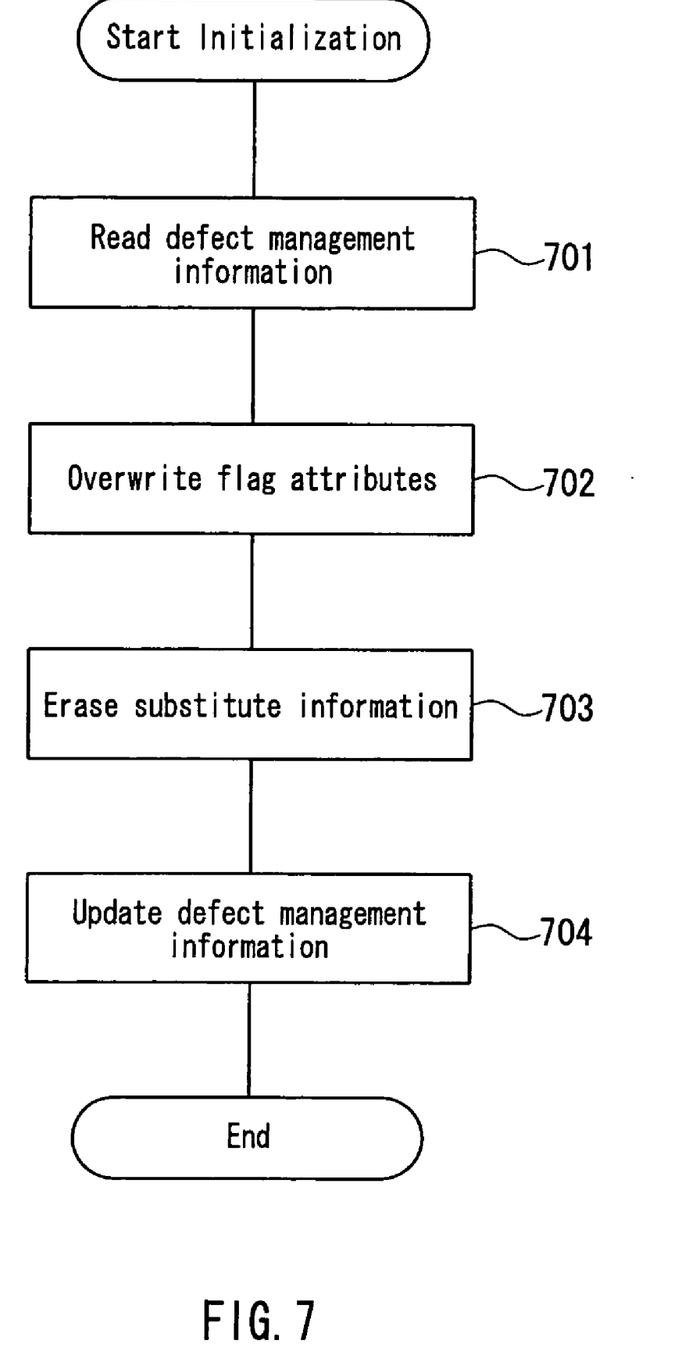
FIG. 7 is a flow chart showing the procedure of physical reformatting processing executed by the disc recording and reproduction drive 1020.

First of all, the process of physical reformatting of the disc 1 by the disc recording and reproduction drive 1020 will be explained by referring to FIG. 7.

The processing starts when the initialization instruction processing module 1025 of the instruction processing module 1021 receives an execution instruction (initialization instruction) regarding physical reformatting from the higher-level control device. When the initialization instruction processing module 1025 receives the instruction to execute physical reformatting, it passes the instruction on to the initialization control module 1070. The initialization control module 1070, first of all, reads the defect management information 10 from the defect management information area 4b of the disc 1 using the defect management information reading module 1071 and stores it in the substitute information storage memory 1050 (Step 701). In addition, the defect management information 10 already may be stored in the substitute information storage memory 1050, and in such a case, Step 701 may be omitted.

Next, the initialization processing module 1072 sets the value of the second status field 21c to 1000 in all the DFL entries 21 forming part of the defect management information 10 stored in the substitute information storage memory 1050 (Step 702). In addition, as shown in FIG. 5B, "1000" is a unique code indicating that the disc 1 has been physically reformatted.

While maintaining information representing the location of defective sectors in the DFL entries 21, the initialization processing module 1072 overwrites information representing the location of the substitute sectors in the DFL entries 21 with dummy data (Step 703). As a result, information on the location of defective sectors is maintained, while information on the location of substitute sectors is erased. However, Step 703 is not essential, and both information on the defective sectors and substitute sectors may be maintained intact.

Next, the defect management information updating module 1073 extracts the defect management information 10 initialized in Step 702 from the substitute information storage memory 1050 and writes it to the defect management information area 4b of the disc 1 (Step 704).

As a result of the above-described processing, during the physical reformatting of the disc 1, the disc recording and reproduction drive 1020 of the present embodiment maintains at least the information on the location of defective clusters in the DFL 12. Therefore, regardless of whether defects are eliminated by cleaning etc. during physical reformatting, clusters registered in the DFL as defective clusters prior to performing the physical reformatting have information on their locations registered in the DFL as defective clusters or clusters likely to be defective even after the physical reformatting.

In comparison with conventional discs, the thus physically reformatted disc 1 offers the advantage of being capable of recording new data at a higher speed. When an instruction is issued to write to clusters with DFL entries 21 in which the value of the second status field 21c is set to 1000, significant user data are not supposed to exist in the clusters as a result of physical reformatting, and therefore the disc recording and reproduction drive 1020 may limit itself to writing only the data that needs to be written without following the read-modified write procedure.

Furthermore, because it is possible that defects may have been eliminated by cleaning etc. during physical reformatting, when an instruction is issued to write to said clusters, a trial attempt may be made to write to said clusters. In this case, when the write attempt is successful, it is determined that defects in said clusters have been eliminated, and therefore the DFL entries for said clusters may be invalidated. The invalidation of the DFL entries is carried out by setting the value of the first status field 21a of said DFL entries to 0010. In addition, if the write attempt fails, it is determined that defects in said clusters have not been eliminated, and therefore spare clusters may be allocated thereto as substitutes and write operations may be performed in the allocated spare clusters as performed in the past.

In addition, when an instruction is issued to read clusters with DFL entries in which the value of the second status field 21c is set to 1000, the disc recording and reproduction drive 1020 may attempt to access the clusters of the disc 1 and reproduce them or may be set up to return dummy data instead of the reproduction data from the disc 1 without checking whether said clusters can be reproduced or not. Otherwise, if an attempt at reproducing the clusters is made and it is found that they can be reproduced at least partially, results obtained by performing correction within the correctable range can be used as reproduction data.

Here, reproduction of ordinary computer data recorded on the disc 1 (not real-time data) is used as an example in order to explain the reproduction method utilized by the disc recording and reproduction drive 1020.

Figure 8:
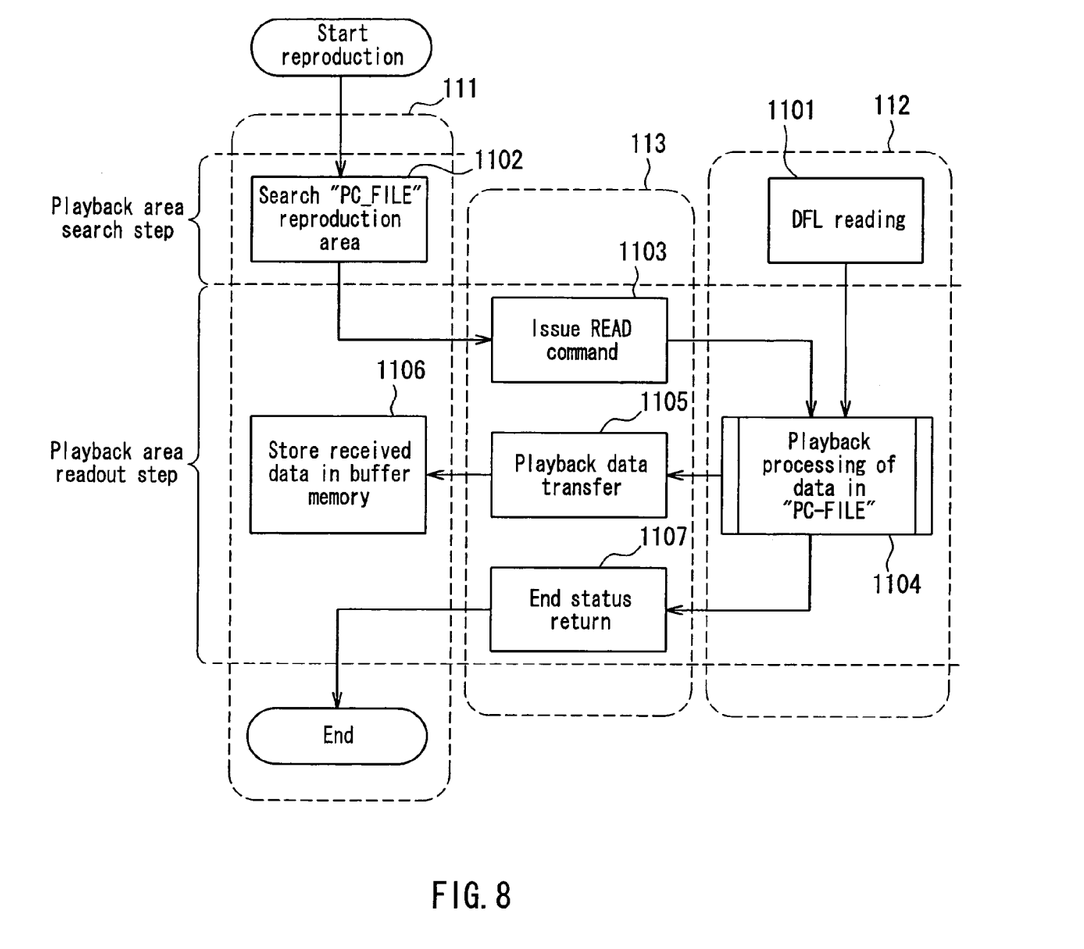
FIG. 8 is a flow chart showing the procedure of reproduction processing executed by the disc recording and reproduction drive 1020.

FIG. 8 shows the steps of the reproduction method.

In FIG. 8, the reference numeral 111 indicates processing executed by the higher-level control device, the reference numeral 112 indicates processing executed by the disc recording and reproduction drive 1020, and the reference numeral 113 indicates the flow of instructions, data, and processing results based on the I/F protocol between the higher-level control device and the disc recording and reproduction drive 1020. In addition, since reproduction processing by the disc recording and reproduction drive 1020 will be described in detail below, explanations here will be provided only in general terms.

When the disc 1 is mounted and when the defect management information is updated, the disc recording and reproduction drive 1020 reads the defect management information on the disc 1 using the DFL reading module 1043 and stores it in the substitute information storage memory 1050 (Step 1101).

The higher-level control device analyzes the file structure and obtains the location of the areas where computer data is stored (Step 1102).

The higher-level control device acquires information indicating the location of the areas obtained in Step 1102 and issues a "READ" command, i.e. an ordinary reproduction instruction, to the disc recording and reproduction drive 1020 (Step 1103).

The reproduction instruction processing module 1024 of the disc recording and reproduction drive 1020 that receives the "READ" command reads the designated data from the disc 1 (Step 1104), transfers the designated data to the higher-level control device (Step 1105) and, when the transfer of all the required data is complete, returns an end status code (Step 1107).

Playback data transferred via the I/F protocol is stored in the data buffer memory of the higher-level control device (Step 1106).

When the higher-level control device receives the end status code via the I/F protocol, data stored in the data buffer memory is used as computer data.

Figure 9:
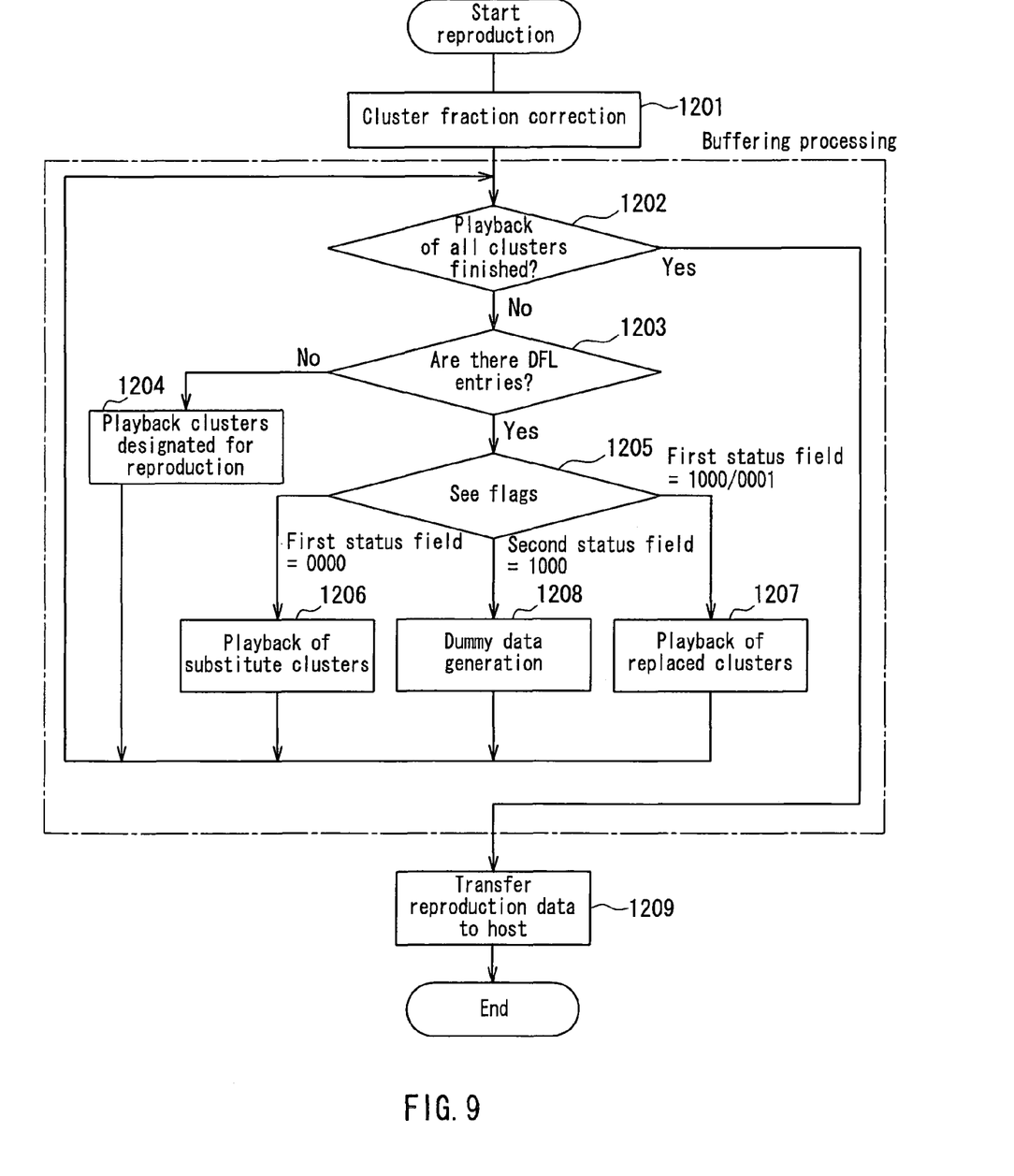
FIG. 9 is a flow chart showing the details of the reproduction processing procedure executed by the disc recording and reproduction drive 1020.

FIG. 9 is a flow chart showing the details of the reproduction processing procedure (Step 1104 in FIG. 8) executed by the disc recording and reproduction drive 1020.

The areas to be reproduced are designated by the higher-level control device in sector units. The fraction correction module 1044 obtains clusters containing the sectors to be reproduced (Step 1201). If the LSN of the head sectors in areas to be reproduced is designated as S, the number of sectors in the areas to be reproduced as N, and the number of sectors that constitute clusters as E, then the number of sectors (N_C) in the areas to be reproduced and LSN (S_C) of the head sectors in the areas to be reproduced, with clusters taken into account, is given by the following formulas.

$$S\_C = [S \div E] \times E$$

$$N\_C = [(S+N+E-1) \div E] \times E - S\_C$$

Here, $[\alpha]$ means the largest integer that does not exceed $\alpha$.

If the process of storing all the clusters intended for reproduction in the data buffer 1060 is not over (Step 1202), the program consults the DFL 12 (Step 1203). As a result, when the clusters intended for reproduction are not registered in the DFL 12 as defective clusters, processing advances to Step 1204 and the cluster reproduction module 1042 reproduces the clusters obtained in Step 1201 and stores them in the data buffer 1060 (Step 1204). On the other hand, when the clusters to be reproduced are registered in the DFL 12 as defective clusters, processing advances to Step 1205.

In Step 1205, the cluster reproduction module 1042 refers to the second status field 21c and first status field 21a of the DFL entries 21 of the clusters (defective clusters) to be reproduced and advances to either one of Steps 1206~1208 below depending on the values.

When the flag 21a-1 of the first status field 21a is 0000, the data of the defective clusters to be reproduced is recorded in spare clusters allocated thereto as substitutes. In this case, processing advances to Step 1206, where the cluster reproduction module 1042 reproduces data from the substitute spare clusters and stores it in the data buffer 1060.

When the flag 21a-1 is 1000 or 0001, substitute clusters are allocated to the defective clusters to be reproduced, or data is not recorded in the substitutes or allocation of substitute clusters is not performed. In this case, processing advances to Step 1207, where the cluster reproduction module 1041 attempts reproduction of data from the replaced clusters, storing the data in the data buffer 1060 if it is successful and reporting an error in case of failure.

In addition, clusters in which the value of the second status field 21c is 1000 are clusters initialized by physical reformatting. In this case, processing advances to Step 1208, where the cluster reproduction module 1042 generates clusters filled with dummy data (0) instead of reproducing clusters from the disc 1. This is based on the premise that significant user data should not be present in said clusters due to the physical reformatting.

In addition, in the present embodiment, when the value of the second status field 21c is 1000, dummy data are generated in Step 1208. However, instead of Step 1208 of the present embodiment, an attempt may be made to reproduce the defective clusters on the disc 1, storing the data that were reproduced in the data buffer 1060 when the reproduction is successful and using the data buffer 1060 to store dummy data produced by zero-filling etc. in case of failure or, in case of partial reproduction, using it to store data that can be obtained from the reproduction data by correction.

When the process of storing all the clusters to be reproduced in the data buffer 1060 is over ("Yes" in Step 1202), the data stored in the data buffer 1060 is transferred to the higher-level control device via the I/O bus 780 and the process terminates.

When a reproduction error is reported, the higher-level control device issues an instruction to perform recording in said clusters. Therefore, substitution processing is carried out, wherein spare clusters are allocated thereto and data is recorded in the allocated spare clusters. As a result, spare clusters that can be reproduced are substituted for defective clusters in the logical volume space.

As described above, when reproduction of defective clusters is required and no spare clusters used for substitution have been allocated thereto, the disc recording and reproduction drive 1020 returns zero-filled data as reproduction data without reporting reproduction errors. Otherwise, when defective blocks to which substitute spare clusters have not been allocated need to be reproduced, it may be set up to report a reproduction error without wasting time on unnecessary reproduction operations that are likely to fail.

The steps of the recording method used for recording ordinary computer data (not real-time data) are practically the same as the steps of the reproduction method shown in FIG. 8, with the exception that a "WRITE" command is issued instead of the "READ" command of FIG. 8 and recording data is transferred in the opposite direction as compared with transfer of reproduction data.

Figure 10:
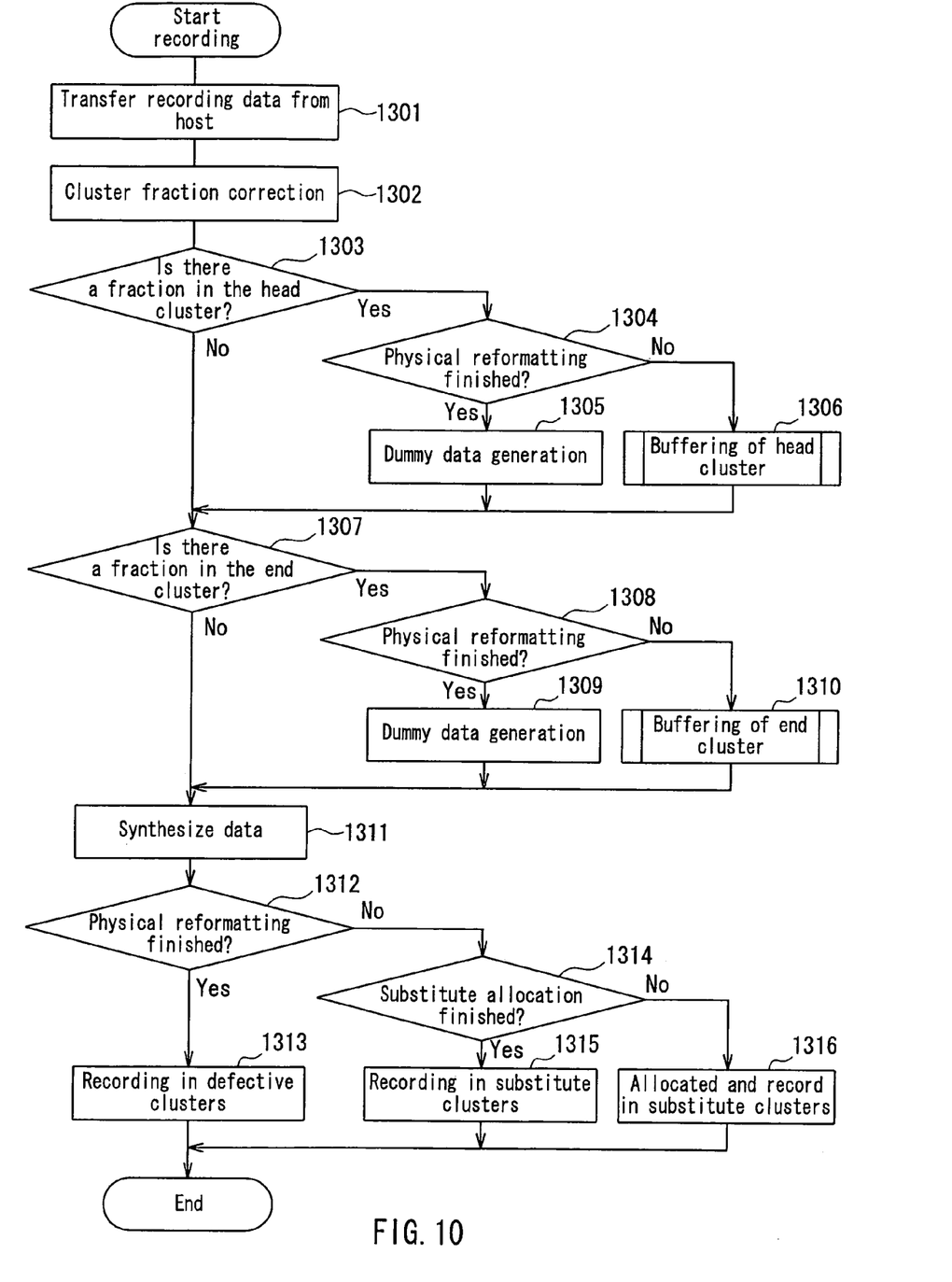
FIG. 10 is a flow chart showing the procedure of recording processing executed by the disc recording and reproduction drive 1020.

FIG. 10 is a flow chart showing the sequence of recording processing executed by the disc recording and reproduction drive 1020.

The disc recording and reproduction drive 1020 receives data to be recorded on the disc 1 from the higher-level control device and stores it in the data buffer 1060 (Step 1301).

The areas where recording needs to be done are designated in sector units. The recordable cluster inspection module 1035 determines the clusters (clusters to be recorded) that include areas where recording is required (Step 1302).

When there is a fraction in a head sector ("Yes" in Step 1304), the device checks whether the cluster containing the head sector has been registered as a DFL entry with attributes indicative of physical reformatting (the second status field 21*c* is 1000) (Step 1304). If it has been registered, reproduction processing intended for the buffering processing of the cluster is not performed, and the data buffer 1060 is instead filled with dummy data (Step 1305). If it has not been registered, reproduction processing intended for buffering processing is carried out (Step 1306).

In the same manner, when there is a fraction in an end sector ("Yes" in Step 1307), the device checks whether the cluster containing the end sector has been registered as a DFL entry with attributes indicative of physical reformatting (Step 1308). If it has been registered, reproduction processing intended for the buffering processing of the cluster is not performed, and the data buffer 1060 is instead filled with dummy data (Step 1309). If it has not been registered, reproduction processing intended for buffering processing is carried out (Step 1310).

Subsequently, data used for recording is synthesized by overwriting the location corresponding to said sector in the data buffer 1060 with data transferred from the host (Step 1311).

Then, if the clusters to be recorded have been registered as DFL entries possessing attributes indicative of physical reformatting ("Yes" in Step 1312), recording is carried out in the clusters shown as defective clusters in said DFL entries regardless of whether substitutes have been allocated (Step 1313).

On the other hand, if the clusters to be recorded have not been registered as DFL entries possessing attributes indicative of physical reformatting ("No" in Step 1312), recording is carried out in substitute spare clusters (Step 1315) if substitutes have been allocated ("Yes" in Step 1314). In addition, if substitutes have not been allocated ("No" in Step 1314), after allocating new substitute spare clusters, recording is carried out in the substitute spare clusters (Step 1316).

In addition, when user data is recorded in clusters shown as defective clusters in DFL entries possessing attributes indicative of physical reformatting (the second status field 21*c* is 1000) or when substitutes are allocated to said clusters and user data is recorded in the substitutes, the codes in the first status field 21*a* of the DFL entries are set in accordance with the circumstances and the contents of the second status field 21*c* are changed from 1000 to 0000.

The disc recording and reproduction drive 1020 of the present embodiment has a feature whereby it inspects areas shown as defective areas in DFL entries possessing attributes indicative of physical reformatting while no operation instructions are issued by the higher-level control device (or during idle time in the course of other processing). Namely, while there are no operation instructions, such as recording instructions or reproduction instructions, issued by the higher-level control device, the inspection processing module 1074 searches all the DFL entries 21 registered in the DFL 12 and examines clusters shown as defective clusters in the DFL entries 21 with "1000" in the second status field 21*c* in order to determine whether they are indeed defective. Then, if defects have been eliminated in said clusters, the inspection processing module 1074 invalidates said DFL entries 21 by setting the first status field 21*a* to 0010. At such time, the value of the second status field 21*c* is changed from 1000 to 0000. On the other hand, if defects in said clusters are confirmed, the inspection processing module 1074 allocates substitute areas to said clusters and, at the same time, sets the first status field 21*a* to 0000 or 1000 and changes the contents of the second status field 21*c* from 1000 to 0000. As a result, the time period during which there are no operation instructions issued by the higher-level control device permits efficient inspection of defects on the physically reformatted disc.

In addition, the above-described embodiment represents just one embodiment of the present invention and does not limit the technical scope of the present invention.

For instance, in the explanations above, a value of 1000 in the second status field 21*c* implied that clusters shown in the field 21*b* had been physically reformatted, in other words, it represented two meanings, i.e. (1) that the defects of the clusters shown in the field 21*b* could have been eliminated by cleaning etc. during physical reformatting, and (2) that no significant user data were present in the defective clusters and in the substitute clusters. However, the above-mentioned items (1) and (2) may be assigned individual codes for each respective meaning so as to perform mutually different recording and reproduction processing depending on the respective code.

In addition, although the disc 1 was exemplified by a BD in the present embodiment, the present invention is similarly applicable to information recording media, in which a single unit of error correction is constituted by a plurality of sectors, such as a DVD. For instance, it is self-evident to persons skilled in the art that in case of a DVD locations described as "clusters" in the present embodiment can be called "ECC blocks".

Furthermore, data transfer between the higher-level control device and the disc recording and reproduction drive, as well as data transfer between the disc recording and reproduction device and the disc, can be carried out either sequentially or simultaneously in parallel. In addition, it is evident that when the higher-level control device and the disc recording and reproduction drive are integrated in a single unit, parameter transfer can be implemented using a shared memory, etc.

The invention claimed is:

1. An information recording device for recording information on an information recording medium including
a volume space for recording user data,
a spare area containing a substitute area that can be used in place of a defective area contained in the volume space, and
a defect management information area for recording defect management information used for managing the defective area,
wherein the defect management information contains a plurality of defect list entries, each defect list entry containing fields that store defect location information indicating a location of the defective area, substitute position information indicating a location of the substitute area, and defect status information indicating an attribute of the defect list entry, the attribute indicating whether significant user data is present in any of the defective area and the substitute area,
the device comprising:
an initialization processing module, which maintains at least the defect location information of the defect management information and overwrites the defect status information to set the attribute to indicate that significant user data is not present in any of the defective area and the substitute area, in each defect list entry for which defect management has been conducted upon receiving an execution instruction for a physical reformatting of the information recording medium.

2. The information recording device, according to claim 1, wherein the initialization processing module erases the substitute location information in the defect list entry, upon receiving an execution instruction of physical reformatting of the information recording medium.

3. The information recording device according to claim 1, further comprising an inspection processing module for inspecting the defective area indicated by the defect list entry having an attribute indicating that physical reformatting has been performed while there is no operation instruction from a higher-level control device and invalidating the defect list entry if defects in the defective area have been eliminated and allocating a substitute area to the defective area if a defect in the defective area is confirmed.

4. The information recording device according to claim 1, wherein, in a case where user data is recorded in the defective area of the defect list entry having an attribute subjected to the physical reformatting, or in a case where the user data is recorded in the substitute area to be a substitute destination of the defective area of the defect list entry having the attribute subjected to the physical reformatting, the defect status information is changed from one form to another form,
wherein one form of the defect status information indicates that significant user data is not present in any of the defective area and the substitute area, and
another form different from the one form of the defect status information indicates that the defect status information is unused.

5. A process for recording defect management information used for managing a defective area onto an information recording medium, the process comprising:
recording user data in a volume space of the information recording medium, using a spare area containing a substitute area in place of the defective area contained in the volume space; and
recording the defect management information in a defect management information area of the information recording medium,
wherein the defect management information contains a plurality of defect list entries, each defect list entry contains fields that store defect location information indicating a location of the defective area, substitute position information indicating a location of the substitute area, and defect status information indicating an attribute of the defect list entry, the attribute indicating whether significant user data is present in any of the defective area and the substitute area, and
the attribute of the defect status information in each defect list entry for which defect management has been conducted after physical reformatting of the information recording medium indicates that the significant user data is not present in any of the defective area and the substitute area.

6. An information recording medium comprising a volume space for recording user data, a spare area containing a substitute area that can be used in place of a defective area contained in the volume space, and a defect management information area for recording defect management information used for managing the defective area,
wherein the defect management information contains a plurality of defect list entries, each defect list entry contains fields that store defect location information indicating a location of the defective area, substitute position information indicating a location of the substitute area, and defect status information indicating an attribute of the defect list entry, the attribute indicating whether significant user data is present in any of the defective area and the substitute area, and
the attribute of the defect status information in each defect list entry for which defect management has been conducted after physical reformatting of the information recording medium indicates that the significant user data is not present in any of the defective area and the substitute area.

* * * * *